Dec. 21, 1926.
E. F. HEARD ET AL
1,611,191
LATHE CARRIAGE
Filed Nov. 14, 1924
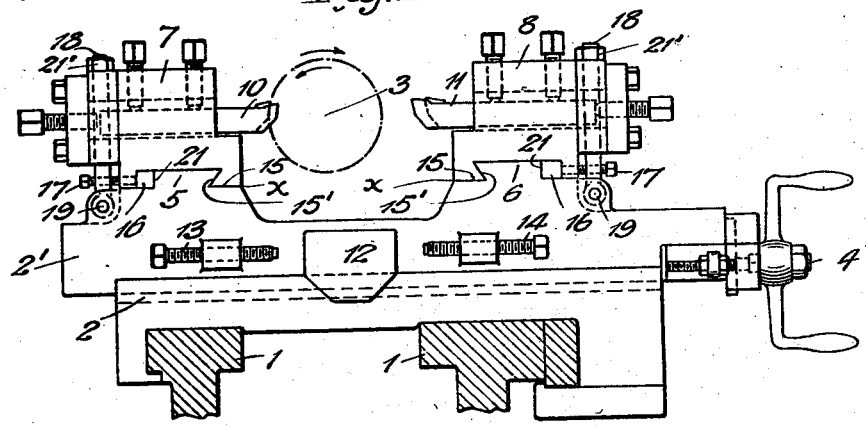
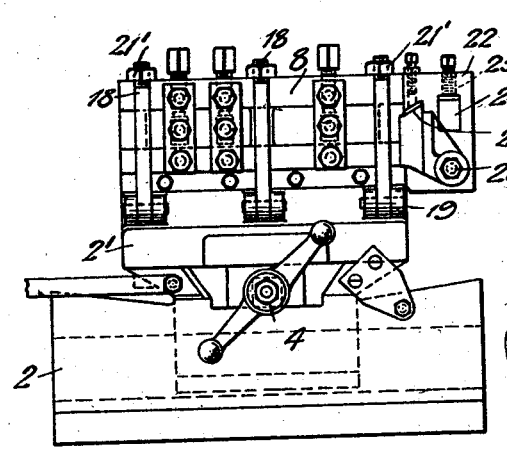
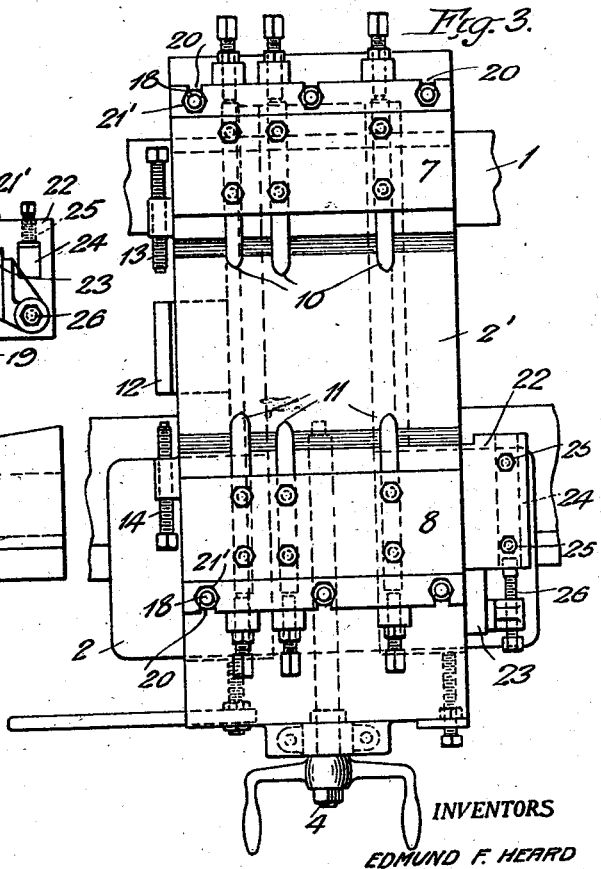
INVENTORS
EDMUND F. HEARD
MAYO M. FITZHUGH
BY
Sheffield & Betts
THEIR ATTORNEYS Patented Dec. 21, 1926.

1,611,191

UNITED STATES PATENT OFFICE.

EDMUND F. HEARD, OF ELIZABETH CITY COUNTY, AND MAYO M. FITZ HUGH, OF NEWPORT NEWS, VIRGINIA, ASSIGNORS TO NEWPORT NEWS SHIPBUILDING & DRY DOCK COMPANY, OF NEWPORT NEWS, VIRGINIA, A CORPORATION OF VIRGINIA.

LATHE CARRIAGE.

Application filed November 14, 1924. Serial No. 749,854.

Our invention relates to lathes and has for its object the provision of an improved device of this character of simple and rugged construction which may be readily adjusted for accurate and rapid operation.

More particularly, our invention relates to a double gang tool holder lathe, whereby an axle or shaft, having a multiplicity of diameter or shapes, may be rough turned and finished in two strokes of the carriage of a double lathe with a central driving head, without changing the relation of the tools to each other during the operation and whereby the entire operation may be performed on one machine without removing the axle or shaft from the machine.

Another object of our invention is to provide removable tool blocks, or holders, whereby the tools may be preset for use and whereby broken or dulled tools may be readily replaced.

Our invention will be better understood from the following description taken in connection with the accompanying drawings and its scope will be pointed out in the appended claims.

In the drawings illustrating our invention:

Fig. 1 is a vertical section taken at right angles to the lathe centers, of a lathe embodying our invention;

Fig. 2 is an elevation of the tool carriage as viewed from the operating side of the machine with the gang tool holder in place, and Fig. 3 is a top plan view of the parts shown in Fig. 1.

Referring to the drawings in which 1 indicates the lathe bed on which is supported a carriage 2, having a slide 2' adapted to be moved toward and from the lathe center axis 3 by the cross-feed screw 4 in a well understood manner. The slide 2' is provided with similar tool seats 5, 6 parallel with and on opposite sides of the lathe center axis 3, which seats respectively support similar tool blocks or holders 7, 8. Each of said holders is provided with a plurality of tools or cutters 10, 11 which are held or fixed therein in the usual manner, with their cutting edges upward. If desired, these tools may be preset by our presetting device, shown and described in our United States Letters Patent No. 1,571,944, issued February 9, 1926. The tools may be used for both turning or forming, the tools in one of the holders being used for roughing and in the other for finishing. Having set the tools 10 and 11 in their respective holders in the proper relation to produce the desired shape of the axle or shaft, the holder with the roughening tools is moved by means of the cross-fed screw 4 to bring the tools into engagement with the work. When the roughing operation is completed, the block is moved away from the work by means of screw 4, which simultaneously advances the block with the finishing tools in a manner readily understood. Inasmuch as both sets of tools are arranged with their cutting edges upward, the rotation of the piece being shaped must be reversed when changing from one set of the tools to the other. It is of course understood that the tool holders may be moved parallel or at an angle to the lathe centers in the usual manner. In order to limit the movement of the slide 2', carriage 2 is provided with a stop 12, adapted to strike against the screws 13 and 14, positioned in opposite sides thereof and carried on the slide 2'. Thus, when the tools have been advanced the proper distance, the screws 13 and 14 are adjusted to bear against the stop 12. In this manner, adjustment may be made for duplicating the work.

To avoid loss of time in case any of the tools become broken, or dulled so as to make replacement necessary, or in order to enable the tools to be preset in the holder, the holders or blocks 7, 8 are made easily removable. Since both blocks are similar, a description of one will suffice.

The bottom surface of the tool holder is channelled and undercut so as to form a V-shaped slot or lip 15 which cooperates with a similar reversed lip 15' on the slide 2'. A key or gib 16 is provided for properly positioning the holder with respect to the lathe centers, which key is set up by a screw 17. The holder is locked on its seat by placing it thereon, and pushing it back until the lip 15 engages lip 15', inserting key 16 and tightening screw 17 and then swinging hinged screws 18, about their pivots 19 on slide 2', until their upper ends engage cooperating slots 20 formed in the tool holder, which screws are then tightened by nuts 21' thereon. The adjusting screws 17 acting against key 16 which is in contact with vertical finished surface 21 of tool seat 6 forces the downward projecting angular lip 15 firmly into contact with the upward projecting angular lip 15', thus maintaining the distance between the center of the lathe and the various tools. At the same time, by allowing proper clearance at the V-angles 15, 15', the action of screws 17 tends to force the bottom of the block firmly down on its seat. Due to the necessary overhanging of the tools, the pressure due to the cutting action causes a tendency for the block or holder to pivot around a point X. Hinged bolts 18 resist this pivoting action by being put in pure tension. Thus no bolts or screws used to secure the holder to the slide rest 2' are stressed in shear.

In order that the end of shafts or axles may be turned or faced, an additional tool holder 22 is provided. While but one of these holders is shown in Fig. 3, it is to be understood that each of the tool holders 7, 8, may be provided with such holders. The holder 22 is carried on a slide 23, fixed to the holder 7 or 8. A tool of suitable form may be inserted in opening 24, and secured by screws 25 and the holder 22 may be moved in slide 23 by screw 26.

While we have referred to double lathes herein, it is to be understood that our invention may be used on single lathes of the engine, automatic or turret types.

From a consideration of the above description, taken in connection with the drawings, our invention will be apparent without further explanation, and the advantages set forth prior to the detailed description will be readily recognized. We do not wish to be understood as being limited to the details of form or arrangement of parts since various changes may be made by those skilled in the art without departing from the spirit and scope of our invention.

What we claim and desire to secure by United States Letters Patent is:

1. In a lathe carriage a transverse tool slide, a screw for adjusting the position of said slide, tool holders mounted on said slide, said slide being provided with transverse seats for allowing transverse movement of said holders on said slide and bolts pivoted on the outer portions of said slide and adapted to engage the outer ends of said holders to counteract the downward pressure of the work on the inner ends of said holders.

2. In a lathe carriage a transverse tool slide having transverse tool holder seats thereon which are undercut along their edges nearest the lathe centerline, duplicate tool holders on opposite sides of the center of said slide and adapted to support a plurality of cutting tools having upper cutting edges so that the cutting pressure of the work thereon is downward when the work is rotated in opposite directions, said tool holder having recesses therein to cooperate with said undercut edges and being removably mounted upon said carriage, said tool holders also having a plurality of recesses in their outer ends, a plurality of bolts pivoted to said slide and adapted to be rotated about their pivot points into said recesses in said holders to retain the tool holder rigidly in position and to counteract the downward pressure of the work at the inner ends of said tool holders.

Signed this 7th day of November, 1924.

EDMUND F. HEARD.
MAYO M. FITZ HUGH.